US 6,634,535 B2

(12) United States Patent
Tatsumi et al.

(10) Patent No.: US 6,634,535 B2
(45) Date of Patent: Oct. 21, 2003

(54) ROLLER SHAFT (75) Inventors: Naoki Tatsumi, Chofu (JP); Kazuya Tamura, Chofu (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/970,045

(22) Filed: Oct. 2, 2001

(65) Prior Publication Data
US 2003/0062393 A1 Apr. 3, 2003

(51) Int. Cl.⁷ .......................... B65H 20/00; B03B 23/02
(52) U.S. Cl. ..................... 226/194; 242/346.2
(58) Field of Search ................. 226/179, 190, 226/194; 242/346.2, 615.2; 360/130.21

(56) References Cited

U.S. PATENT DOCUMENTS

| 3,087,665 | A | * | 4/1963 | Thomas ....................... 226/190 |
| 3,537,631 | A | * | 11/1970 | Fujii ............................ 226/191 |
| 4,261,788 | A | * | 4/1981 | McClung ..................... 226/194 |
| 4,770,550 | A | * | 9/1988 | Takahashi ................... 226/194 |
| 5,414,585 | A | | 5/1995 | Saliba |
| 5,501,386 | A | * | 3/1996 | Kobayashi ................. 226/190 |
| 5,793,574 | A | | 8/1998 | Cranson et al. |
| 5,857,634 | A | | 1/1999 | Hertrich |
| 5,862,014 | A | | 1/1999 | Nute |
| 5,957,361 | A | * | 9/1999 | Kobayashi et al. .......... 226/194 |

FOREIGN PATENT DOCUMENTS

| JP | 6-103655 | * | 4/1994 |
| JP | 6-195823 | * | 7/1994 |
| JP | 2000-100025 A | | 4/2000 |
| JP | 2000-100116 A | | 4/2000 |
| JP | 2000-149491 A | | 5/2000 |
| WO | WO86/07295 A1 | | 12/1986 |
| WO | WO86/07471 A1 | | 12/1986 |

* cited by examiner

Primary Examiner—Michael R. Mansen
(74) Attorney, Agent, or Firm—Frishauf, Holtz, Goodman & Chick, P.C.

(57) ABSTRACT

A roller shaft (10) is provided which includes a shaft portion (12) of a substantially solid cylindrical shape and a flange portion (14) of a disk-like shape. The shaft portion (12) includes a hollow cylindrical portion (121) having a substantially hollow shape and formed at a lower end (10a) side. The hollow cylindrical portion has an inner peripheral surface with a female screw (12a) formed thereon. A D-shaped cut (122) may be provided on an outer peripheral wall of the hollow cylindrical portion for positioning the roller shaft (10) with respect to the chassis (32) and for preventing the roller shaft from rotating around the chassis, or a D-shaped cut (141) or a slot (142) may be formed in the flange portion (14).

3 Claims, 8 Drawing Sheets

ROLLER SHAFT

BACKGROUND OF THE INVENTION

This invention relates to a linear tape storage system represented by DLT (Digital Linear Tape) or LTO (Linear Tape Open) and, in particular, to a roller shaft for rotatably supporting, on a chassis, a guide roller which serves to guide a magnetic tape pulled out from a tape cassette (tape cartridge) to a magnetic head.

A linear tape storage system of the type has been developed as a backup for a computer system. A variety of linear tape storage systems have heretofore been proposed. For example, a digital linear tape drive as the DLT is disclosed in U.S. Pat. No. 5,862,014.

The digital linear tape drive (hereinafter may simply be called "driving apparatus", "tape drive" or "drive") is adapted to receive a tape cartridge (hereinafter may simply be called "cartridge" or "cassette") having a single reel (supply tape reel). The digital linear tape drive includes a take-up reel in the interior thereof. When the tape cartridge is received in the driving apparatus, a magnetic tape is pulled out from the tape cartridge to be taken up around the take-up reel through a head guide assembly (HGA). The head guide assembly serves to guide, to a magnetic head, the magnetic tape (hereinafter may simply be called "tape") pulled out from the tape cartridge. The magnetic head exchanges information to and from the tape. Typically, the head guide assembly comprises an aluminum plate having a boomerang-like shape and a plurality of large guide rollers, six in number, comprising bearings.

The head guide assembly is also called a tape guide assembly which is disclosed, for example, in U.S. Pat. No. 5,414,585. An example of the guide roller is disclosed in Japanese Unexamined Patent Publication No. 2000-100025.

As disclosed in U.S. Pat. No. 5,793,574 for example, a tape drive typically comprises a substantially rectangular housing having a common base. The base has two spindle motors. The first spindle motor has a spool (take-up reel) permanently mounted to the base. The spool is dimensioned to accept a magnetic tape streaming at a relatively high speed. The second spindle motor is adapted to receive a removable tape cartridge. The removable tape cartridge is manually or automatically inserted into the drive via a slot formed on a housing of the drive. When the tape cartridge is inserted into the slot, the cartridge is engaged with the second spindle motor. Prior to rotation of the first and the second spindle motors, the tape cartridge is connected to the permanently mounted spool by means of a mechanical buckling mechanism. A number of rollers (guide rollers) positioned between the tape cartridge and the permanently mounted spool guide the magnetic tape as it streams at a relatively high speed back and forth between the tape cartridge and the permanently mounted spool.

The digital linear tape drive of the above-mentioned structure requires a device for pulling the tape from the supply tape reel to the take-up reel. Such pulling device is disclosed, for example, in International Publication No. WO86/07471. According to the publication, the take-up reel is provided with take-up leader means (first tape leader) coupled thereto. To the tape on the supply tape reel, supply tape leader means (second tape leader) is fixed. The first tape leader has a tab formed at its one end. The second tape leader has a locking hole. The tab is engaged with the locking hole. The take-up leader means (first tape leader) may be called a take-up leader tape, and the supply tape leader means (second tape leader) may be called a supply leader tape.

Furthermore, a mechanism for joining the first tape leader to the second tape leader is required. Such joining mechanism is disclosed, for example, in International Publication No. WO86/07295.

Japanese Unexamined Patent Publication No. 2000-100116 discloses "Structure of Leader Tape Engaging Part" capable of locking an end of a leader tape to a tape end hooking part of the tape cartridge without requiring a tab protruding on a lateral side of the leader tape (second tape leader).

U.S. Pat. No. 5,857,634 discloses a lock system for preventing the rotation of the take-up reel of the tape drive when the tape cartridge is not inserted into the drive.

The tape drive further comprises a tape head actuator assembly. The tape head actuator assembly is positioned between the take-up spool and the tape cartridge along a tape path defined by a plurality of guide rollers. In operation, the magnetic tape streams back and forth between the take-up spool and the tape cartridge, coming into close proximity to the head actuator assembly while streaming along the defined tape path. An example of the head actuator assembly is disclosed in U.S. Pat. No. 5,793,574 mentioned above.

On the other hand, Japanese Unexamined Patent Publication No. 2000-149491 discloses an example of the tape cartridge to be received in the digital linear tape drive.

As described above, the guide roller provided in the tape drive serves to guide the magnetic tape pulled out from the tape cartridge to the magnetic head. The guide roller is rotatably supported by the roller shaft mounted on the chassis.

Figure 1:
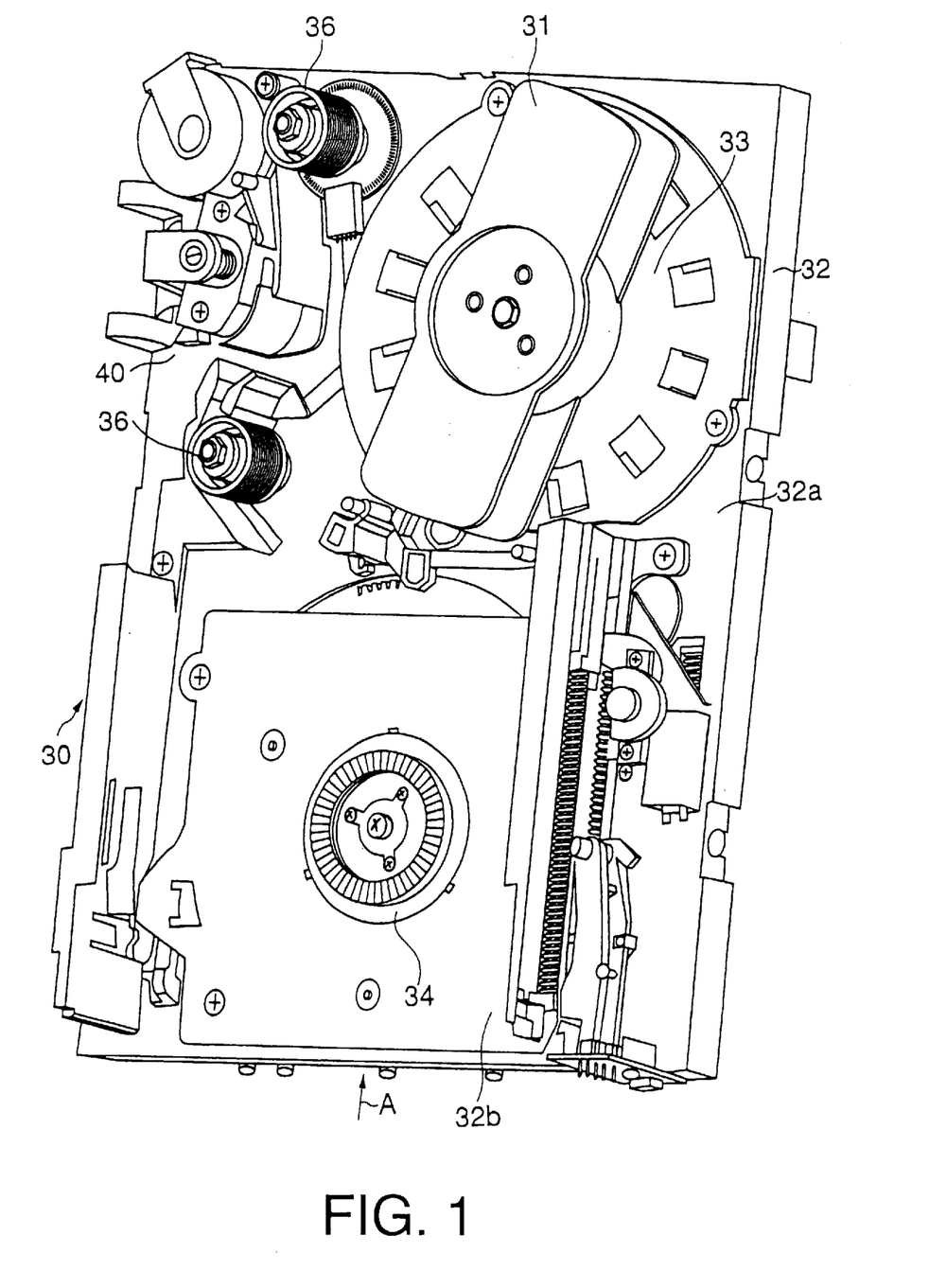
FIG. 1 is a perspective view of the structure of a tape drive to which a roller shaft is applicable.

Referring to FIG. 1, description will be made of the structure of a tape drive. FIG. 1 is a perspective view of the tape drive in a state where its upper cover is removed.

The tape drive 30 serves to receive a tape cartridge (not shown) and includes a take-up reel 31 in the interior thereof. The take-up reel 31 is also called a spool. The tape drive 30 comprises a substantially rectangular housing (gear chassis) 32 having a common base 32a. The base 32a has two spindle motors (reel motors) 33 and 34. The first spindle motor 33 has a spool (take-up reel) 31 permanently mounted to the base 32a. The spool 31 is dimensioned to receive a magnetic tape (not shown) streaming at a relatively high speed. The first spindle motor 33 may be called a take-up reel motor. The second spindle motor 34 is adapted to receive a removable take cartridge (not shown) The second spindle motor 34 may be called a reel supply motor. The removable tape cartridge is manually or automatically inserted into the drive 30 along an insertion direction indicated by an arrow A via a slot 32b formed on a housing (chassis) 32 of the drive 30. When the tape cartridge is inserted into the slot 32b, the cartridge is engaged with the second spindle motor (reel supply motor) 34 by means of a loading mechanism well known in the art. Prior to rotation of the first and the second spindle motors 33 and 34, the tape cartridge is connected to the permanently mounted spool 31 by means of a mechanical buckle. A number of rollers (guide rollers) 36 positioned between the tape cartridge and the permanently mounted spool 31 guide the magnetic tape as it streams at a relatively high speed back and forth between the tape cartridge and the permanently mounted spool 31. The housing 32 comprises a sheet metal chassis made of an iron-based magnetic material.

The tape drive 30 further comprises a magnetic tape head actuator assembly (hereinafter may simply be called "actuator assembly" or "magnetic head") 40. The actuator assembly (magnetic head) 40 is positioned between the take-up spool 31 and the tape cartridge along a tape path (not shown) defined by the above-mentioned plurality of guide rollers 36. In operation, the magnetic tape streams back and forth between the take-up spool 31 and the tape cartridge, coming into close proximity to the actuator assembly 40 while streaming along the defined tape path.

Figure 2A:
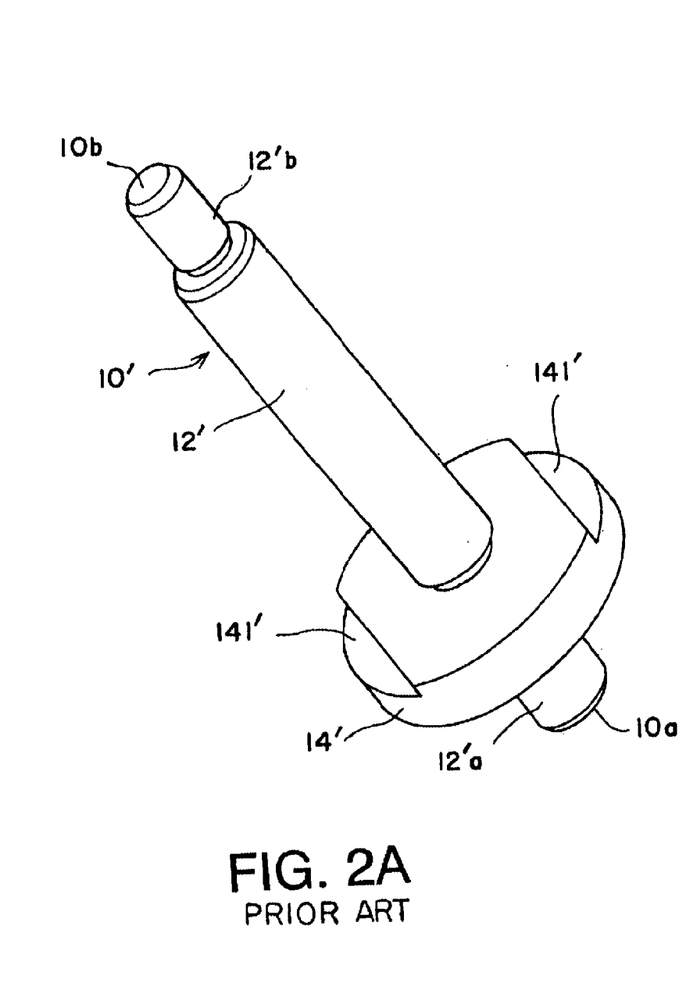
FIGS. 2A and 2B are a perspective view and a front view of an existing roller shaft, respectively.
Figure 2B:
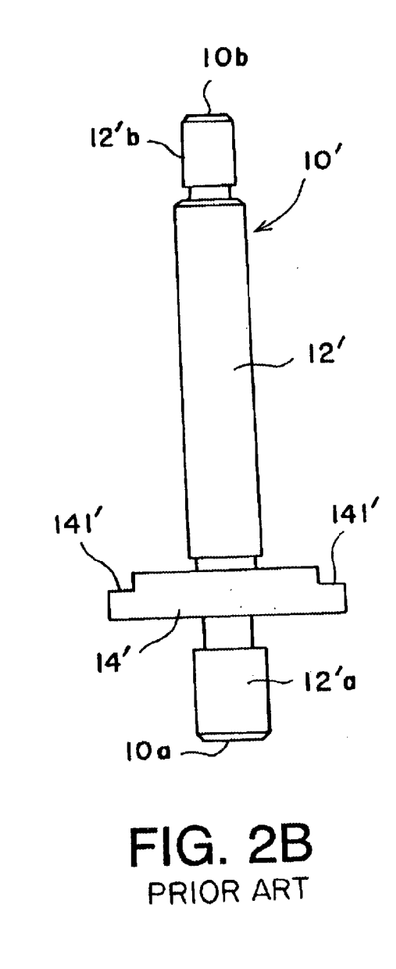

Referring to FIGS. 2A and 2B, description will be made of an existing roller shaft 10' for rotatably supporting the guide roller 36 on the chassis 32. FIG. 2A is a perspective view of the existing roller shaft 10', and FIG. 2B is a front view of the existing roller shaft 10'.

The roller shaft 10' comprises a shaft portion 12' having a substantially solid cylindrical shape and extending in its longitudinal direction (rotation axis direction) from a lower end 10a to an upper end 10b, and a flange portion 14' having a substantially disk-like shape and formed around the shaft portion 12' at a position apart from the lower end 10a by a predetermined distance to extend in a radial direction perpendicular to the rotation axis.

The shaft portion 12' is provided with a male screw 12'a formed at the lower end 10a and a male screw 12'b formed at the upper end 10b. The male screw 12'a at the lower end 10a side serves to mount this roller shaft 10' on the chassis 32 (FIG. 1) Specifically, by screw-engaging the male screw 12'a with a female screw (not shown) formed in the chassis 32, the roller shaft 10' can be mounted on the chassis 32. On the other hand, the male screw 12'b at the upper end 10b side is adapted to screw-engage a nut (not shown) for adjusting the height of the guide roller 36.

The flange portion 14' comprises a pair of D-shaped cuts 141', 141' formed on its upper surface at circumferential end portions opposite to each other with the shaft portion 12' interposed therebetween. This pair of D-shaped cuts 141', 141' serve to facilitate screw-fastening of the roller shaft 10' into the chassis 32. Specifically, by pressing any screw-fastening member (not shown) against the D-shaped cuts 141', 141' and simultaneously rotating the screw-fastening member around the rotation axis, it is possible to easily screw-fasten the roller shaft 10' to the chassis 32.

However, the above-described existing roller shaft 10' has problems as mentioned below.

The first problem is that, when vibration or shock is applied to the chassis 32, the male screw 12'a of the shaft portion 12' in screw-engagement with the chassis 32 will be loosened. This is because the roller shaft 10' is directly screw-engage with the chassis 32. Further, the male screw 12'b is screw-engaged with the nut (not shown) for adjusting the height of the guide roller 36. During adjustment of the nut (not shown) for adjusting the height of the guide roller 36, the male screw 12'a will be loosened.

The second problem is that, in order to facilitate screw-fastening of the roller shaft 10', the flange portion 14' must be provided with the D-shaped cuts 141', 141' formed at two positions thereof. Because the D-shaped cuts 141', 141' are formed, the cost of the roller shaft 10' becomes inevitably high.

SUMMARY OF THE INVENTION

It is therefore an object of the present invention to provide a roller shaft which can be firmly mounted on a chassis without loosening of a screw even if vibration or shock is applied to the chassis of a tape drive or even if adjustment of the height of a guide roller is performed.

It is another object of the present invention to provide a roller shaft which is inexpensive.

According to the present invention, there is provided a roller shaft (10, 10A, 10B) for rotatably supporting on a chassis (32) a guide roller (36) mounted in a tape drive (30), the roller shaft comprising a shaft portion (12) having a substantially solid cylindrical shape and extending in a rotation axis direction from a lower end (10a) to an upper end (10b), and a flange portion (14) having a disk-like shape and formed around the shaft portion at a position apart from the lower end by a predetermined distance to extend in a radial direction perpendicular to the rotation axis, the shaft portion (12) comprising a hollow cylindrical portion (121) having a substantially hollow cylindrical shape and formed at the lower end side, the hollow cylindrical portion having an inner peripheral surface on which a female screw (12a) is formed, the roller shaft further comprising positioning and rotation preventing means (122, 141, 142) for positioning the roller shaft with respect to the chassis and for preventing the roller shaft from rotating with respect to the chassis, the roller shaft being mounted on the chassis by inserting the hollow cylindrical portion in a mounting hole (321) bored in the chassis and by screw-engaging a screw (16) with the female screw.

In the above-described roller shaft, the positioning and rotation preventing means may comprise a D-shaped cut (122) formed on an outer peripheral wall of the hollow cylindrical portion at one place thereof or may comprise a D-shaped cut (141) or a slot (142) formed on the flange portion at one place thereof. Further, the screw (16) may be a screw with a spring washer. Moreover, the shaft portion may be threaded at the upper end side to form a male screw (12b) to be screw-engaged with a nut for adjusting the height of the guide roller.

The above-mentioned reference numerals enclosed in parentheses are affixed to facilitate an understanding of the present invention and are no more than mere examples. It will readily be understood that the present invention is not limited thereto.

DESCRIPTION OF THE PREFERRED EMBODIMENT

Hereinbelow, embodiments of the present invention will be described in detail with reference to the drawings.

Figure 3:
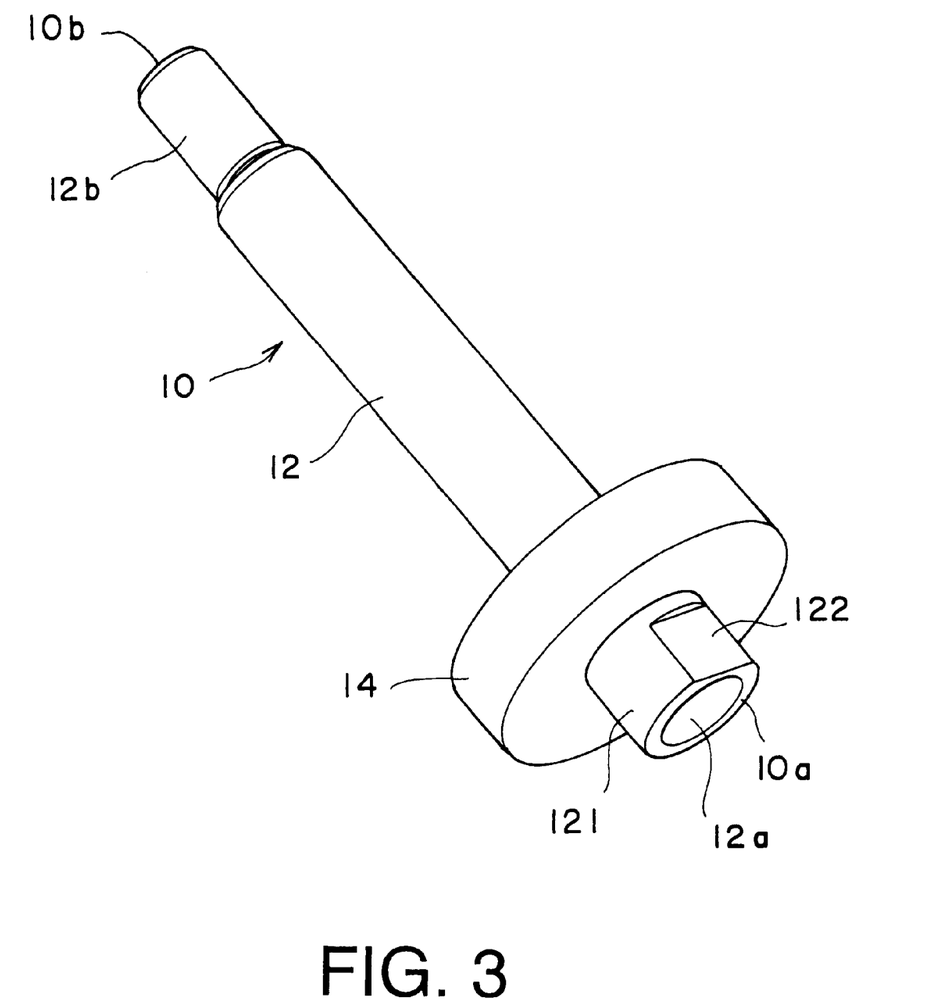
FIG. 3 is a perspective view of a roller shaft according to a first embodiment of the present invention.

Referring to FIG. 3, description will be made of a roller shaft 10 according to a first embodiment of the present invention.

The illustrated roller shaft 10 is for rotatably supporting a guide roller 36 (FIG. 1) on a chassis 32.

The roller shaft 10 comprises a shaft portion 12 having a substantially solid cylindrical shape and extending in its longitudinal direction (rotation axis direction) from a lower end 10a to an upper end 10b, and a flange portion 14 having a disk-like shape and formed around the shaft portion at a position apart from the lower end 10a by a predetermined distance to extend in a radial direction perpendicular to the rotation axis.

The shaft portion 12 comprises a hollow cylindrical portion 121 having a substantially hollow cylindrical shape and formed at its lower end 10a side. The hollow cylindrical portion 121 has an inner peripheral surface on which a female screw 12a is formed by tapping. In addition, a D-shaped cut 122 is formed on an outer peripheral wall of the hollow cylindrical portion 121 at one place thereof.

Figure 4:
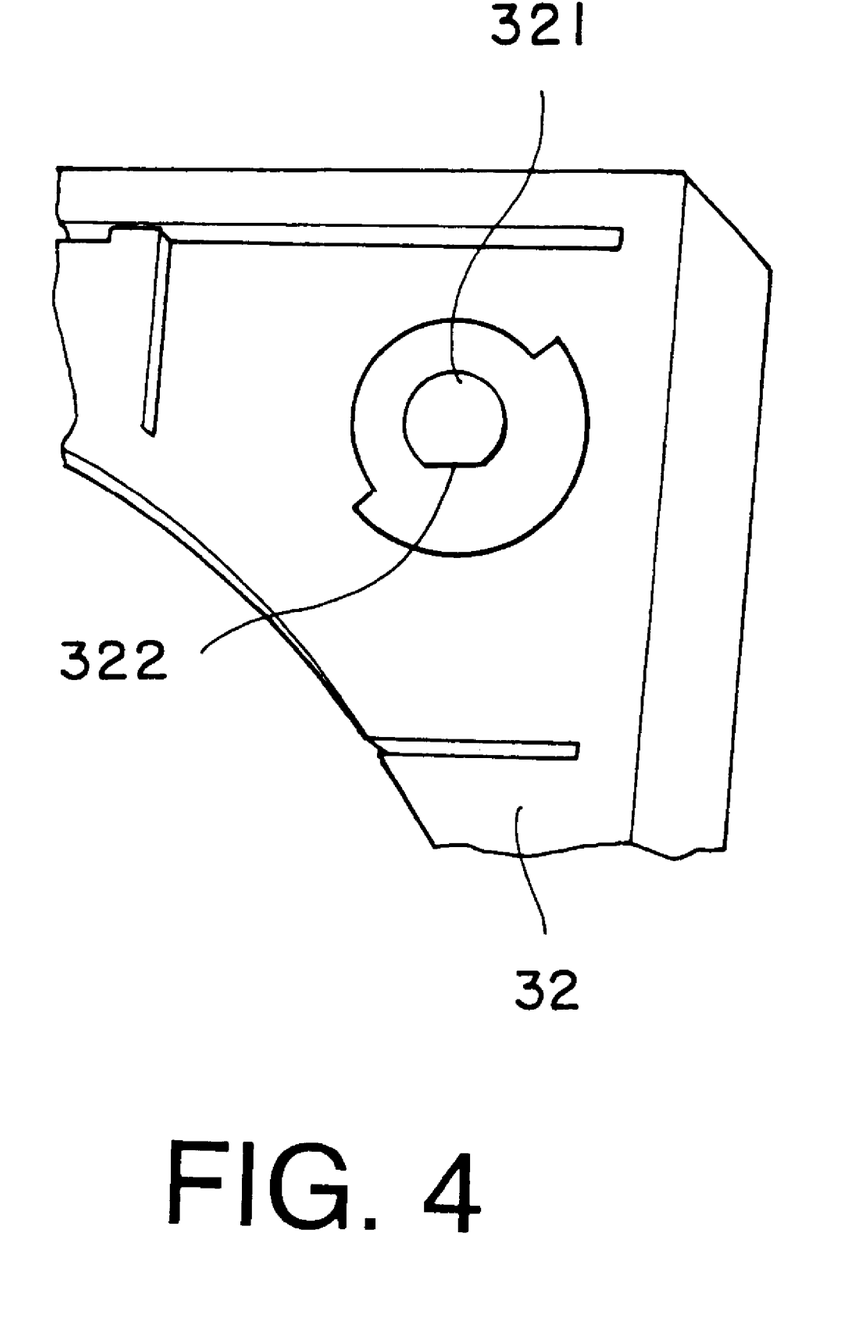
FIG. 4 is a perspective view showing a portion of a mounting hole of a chassis for mounting the roller shaft illustrated in FIG. 3.

On the other hand, as shown in FIG. 4, in order to mount the roller shaft 10, the chassis 32 is provided with a mounting hole 321 having a size substantially same as that of the external shape of the hollow cylindrical portion 121. The mounting hole 321 is provided with a D-shaped cut 322 corresponding to the D-shaped cut 122 of the hollow cylindrical portion 121. Specifically, the D-shaped cut 122 of the hollow cylindrical portion 121 cooperates with the D-shaped cut 322 of the mounting hole 321 to serve as positioning and rotation preventing means for positioning the roller shaft 10 with respect to the chassis 32 and for preventing the roller shaft 10 from rotating with respect to the chassis 32.

Figure 5:
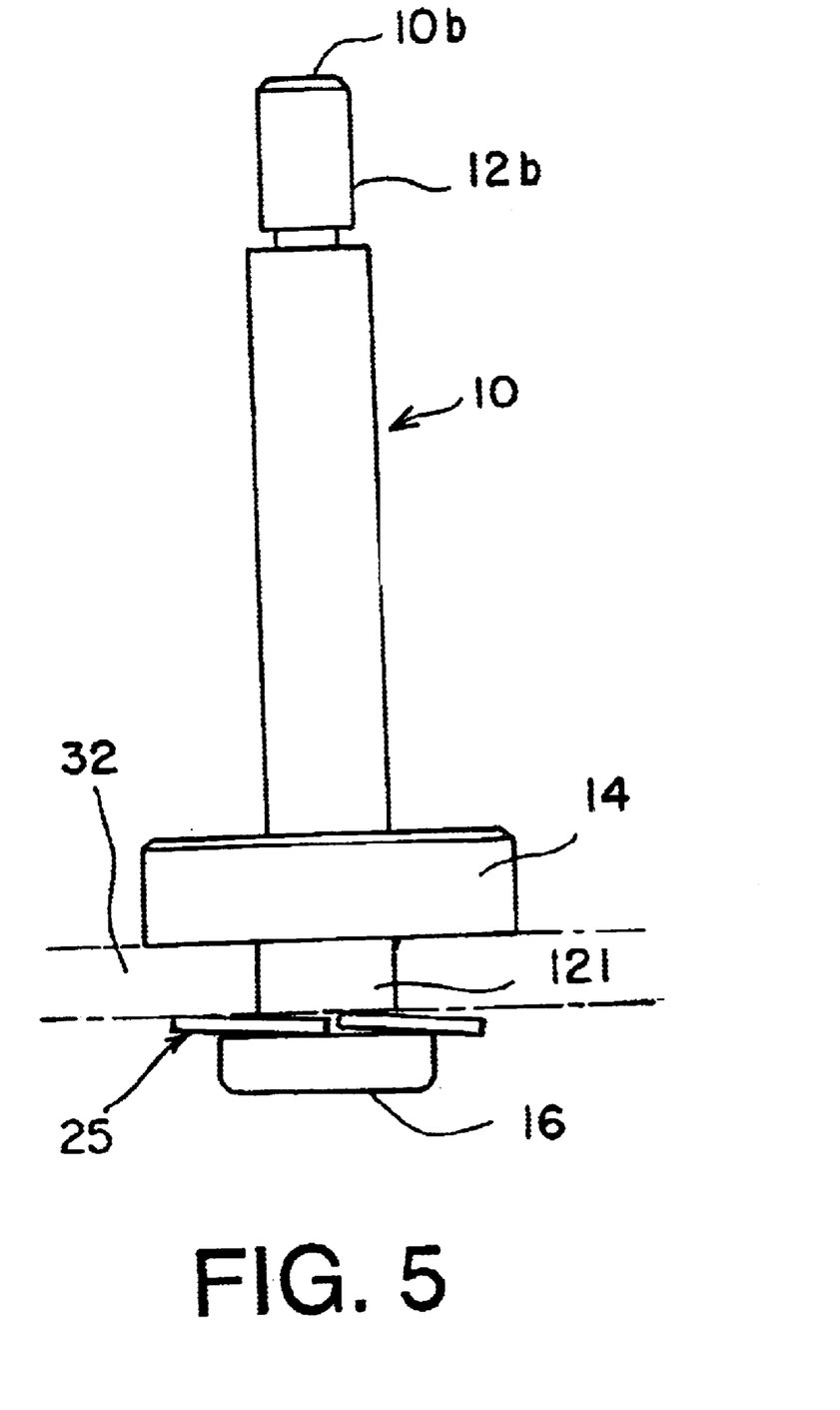
FIG. 5 is a front view showing a state where the roller shaft illustrated in FIG. 3 is mounted on the chassis illustrated in FIG. 4.

In order to mount the roller shaft 10 on the chassis 32, the hollow cylindrical portion 121 of the shaft portion 12 is inserted in the mounting hole 321 of the chassis 32, and thereafter, a screw 16 is screw-engaged with the female screw 12a of the hollow cylindrical portion 121, as shown in FIG. 5.

On the other hand, the shaft portion 12 is provided with a male screw 12b formed at the upper end 10b side, in the manner similar to the existing structure. The male screw 12b at the upper end 10b side serves to screw-engage a nut (not shown) for adjusting the height of the guide roller 36.

As described so far, in this embodiment, the D-shaped cut 122 is provided at one place in a portion to be inserted into the chassis 32. In addition, the female screw 12a is provided on the inner peripheral surface of the hollow cylindrical portion 121 of the shaft portion 12. It is therefore possible to obtain a high return torque. As a consequence, even if vibration or shock is applied to the chassis 32, it is possible to prevent the screw 16 from loosening and to firmly mount the roller shaft 10 on the chassis 32. Further, inasmuch as the D-shaped cut 122 is formed at the portion to be inserted into the chassis 32, the screw 16 is not applied with a load even when the nut (not shown) for adjusting the height of the guide roller 36 is rotated. Moreover, although the screw 16 is additionally required in comparison with the existing roller shaft 10', it is possible to achieve the reduction in cost because the D-shaped cut at another place can be deleted.

Figure 6:
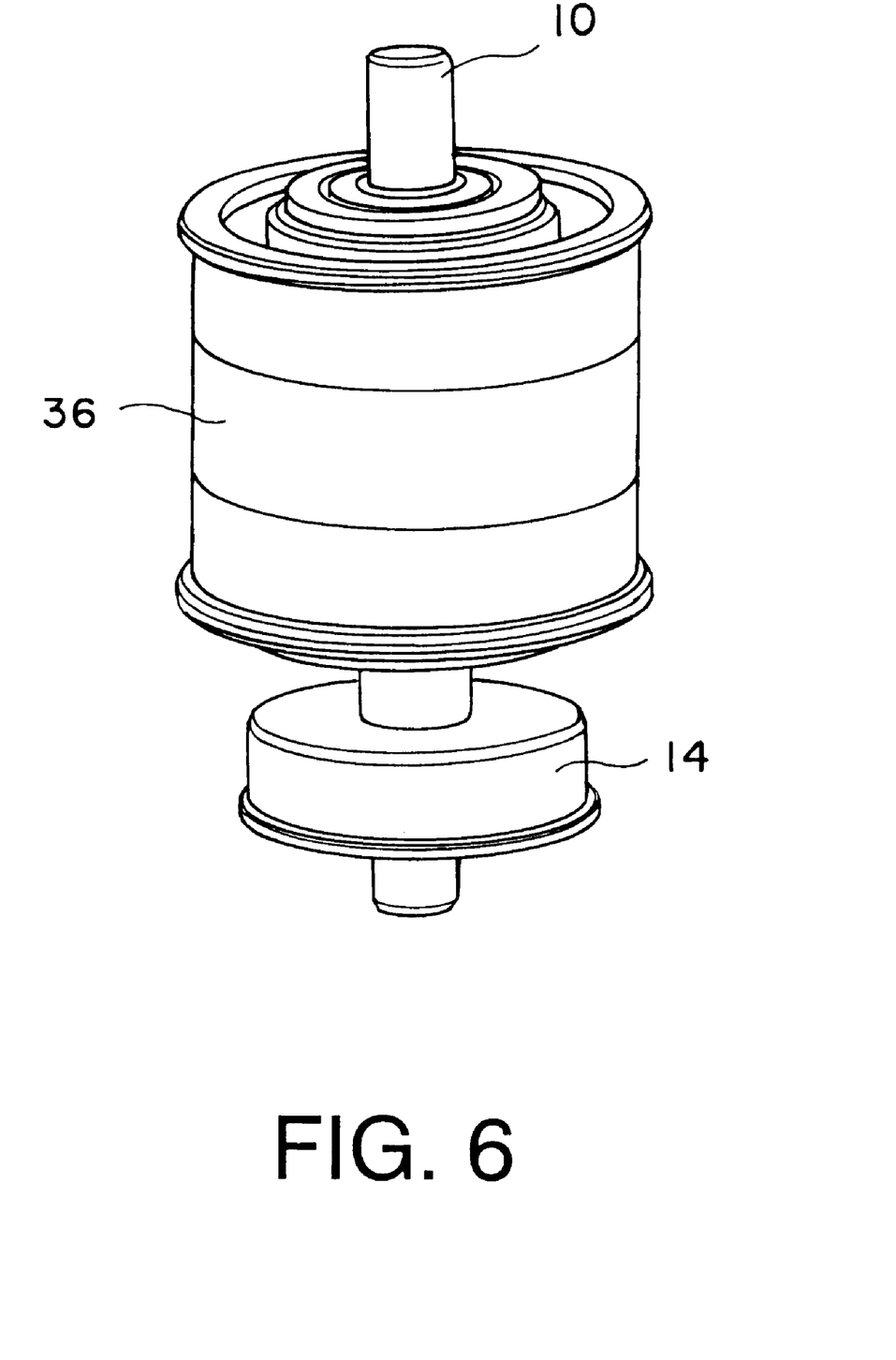
FIG. 6 is a perspective view showing a state where a guide roller is mounted on the roller shaft illustrated in FIG. 5.

FIG. 6 shows a state where the guide roller 36 is mounted on the roller shaft 10 shown in FIG. 5.

In the above-mentioned first embodiment, the D-shaped cut 122 serving as the positioning and rotation preventing means is provided on the shaft portion 12. However, as described in the following embodiments, the positioning and rotation preventing means may be provided on the flange portion 14.

Figure 7:
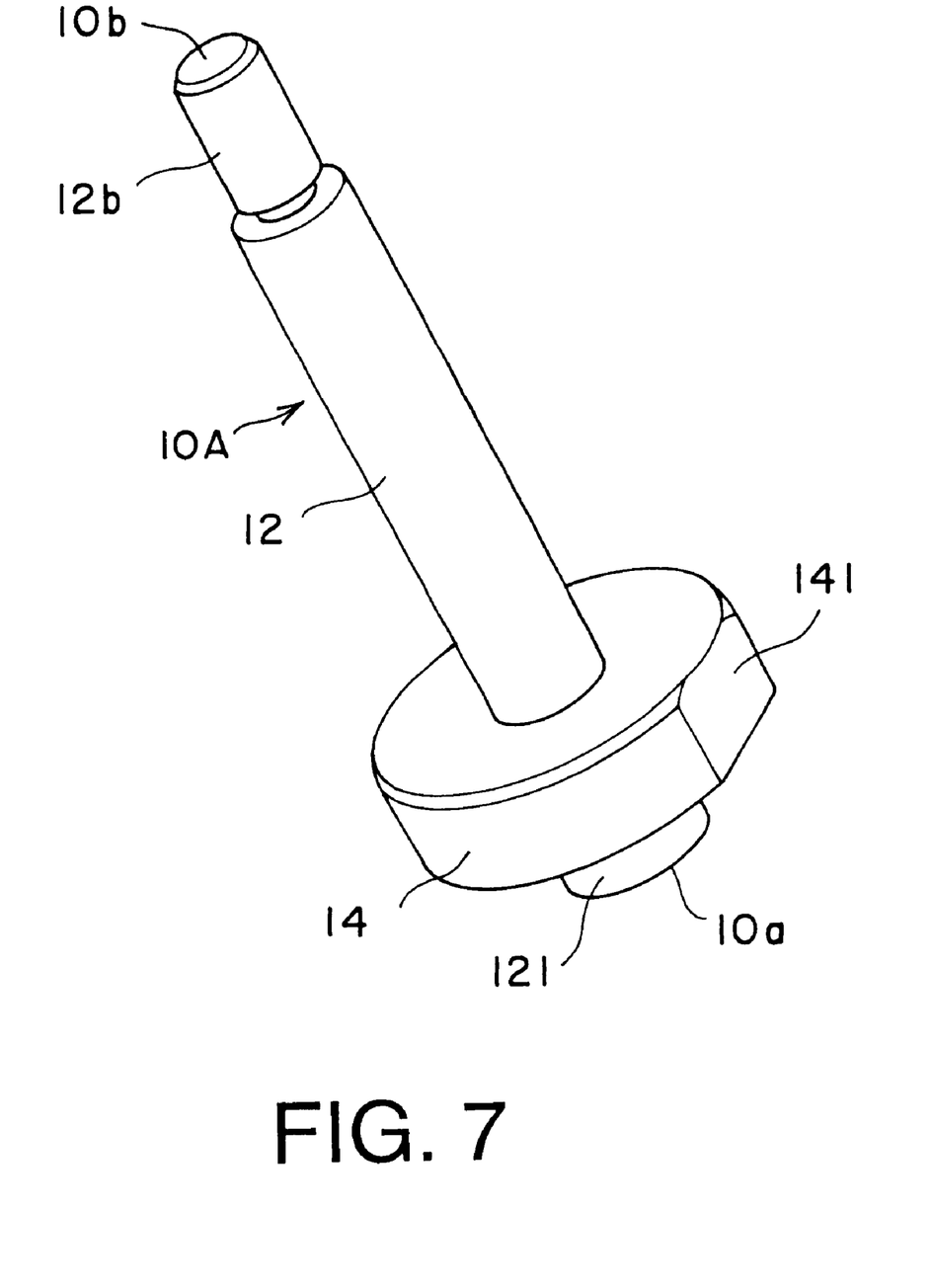
FIG. 7 is a perspective view of a roller shaft according to a second embodiment of the present invention.

Referring to FIG. 7, a roller shaft 10A according to a second embodiment of the present invention is similar in structure to the roller shaft 10 shown in FIG. 3 except that the D-shaped cut 141 as the positioning and rotation preventing means is provided not on the hollow cylindrical portion 121 of the shaft portion 12 but on the flange portion 14.

In this event, it is necessary that the chassis 32 is provided with a circular mounting hole substantially same in size as the hollow cylindrical portion 121 as well as positioning and rotation preventing means adapted to be brought into contact with the D-shaped cut 141. It is apparent that the roller shaft 10A of the above-mentioned structure also exhibits the function and the effect similar to those of the first embodiment described above.

Figure 8:
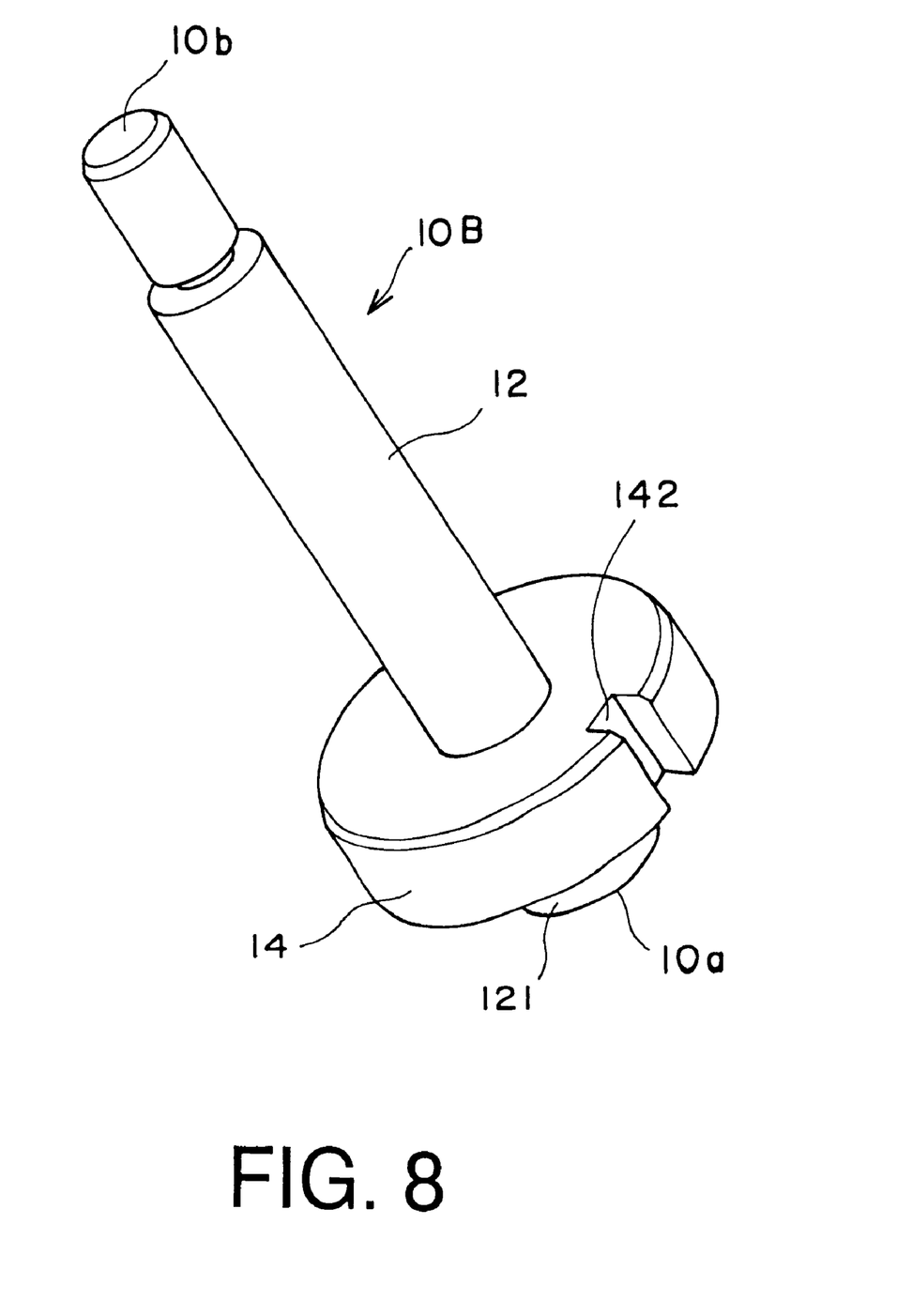
FIG. 8 is a perspective view of a roller shaft according to a third embodiment of the present invention.

Referring to FIG. 8, a roller shaft 10B according to a third embodiment of the present invention is similar in structure to the roller shaft 10A shown in FIG. 7 except that, as the positioning and rotation preventing means, a slot 142 is provided instead of the D-shaped cut 141.

In this event, it is necessary that the chassis 32 is provided with a circular mounting hole substantially same in size as the hollow cylindrical portion 121 as well as positioning and rotation preventing means adapted to be brought into contact with the slot 142. It is apparent that the roller shaft 10B of the above-mentioned structure also exhibits the function and the effect similar to those of the first and the second embodiments described above.

Although the present invention has thus far been described in conjunction with the preferred embodiments, it will be readily understood that this invention is not restricted to the foregoing embodiments. For example, as the screw for mounting the roller shaft on the chassis, use may be made of a screw with a spring washer 25, as shown in FIG. 5. In this case, it is possible to further prevent the screw from loosening.

What is claimed is:

1. A roller shaft for rotatably supporting on a chassis a guide roller mounted in a tape drive, said roller shaft comprising:

a shaft portion having a substantially solid cylindrical shape and extending in a rotation axis direction from a lower end to an upper end;

a flange portion having a disk-like shape and formed around said shaft portion at a position apart from said lower end by a predetermined distance to extend in a radial direction perpendicular to said rotation axis; and positioning and rotation preventing means for positioning said roller shaft with respect to said chassis and for preventing said roller shaft from rotating with respect to said chassis;

wherein said shaft portion comprises a hollow cylindrical portion formed at the lower end, and said hollow cylindrical portion has a substantially hollow cylindrical shape and an inner peripheral surface on which a female screw is formed;

wherein said roller shaft is mounted on said chassis by inserting said hollow cylindrical portion in a mounting hole bored in said chassis and by screw-engaging a screw with said female screw; and wherein said positioning and rotation preventing means comprises a D-shaped cut formed on an outer peripheral wall of said hollow cylindrical portion.

2. A roller shaft as claimed in claim 1, wherein said screw is provided with a spring washer.

3. A roller shaft as claimed in claim 1, wherein said shaft portion is threaded at the upper end to form a male screw to be screw-engaged with a nut for adjusting a height of said guide roller.

* * * * *